United States Patent [19]

LeDoux et al.

[11] Patent Number: 5,112,211
[45] Date of Patent: May 12, 1992

[54] PIPE LINING APPARATUS

[75] Inventors: Patrick LeDoux; Luc Fourgaut, both of New Orleans, La.

[73] Assignee: Pipe Liners, Inc., Metairie, La.

[21] Appl. No.: 626,536

[22] Filed: Dec. 12, 1990

Related U.S. Application Data

[62] Division of Ser. No. 114,949, Oct. 30, 1987, Pat. No. 4,985,196.

[51] Int. Cl.⁵ .............................................. B29C 35/00
[52] U.S. Cl. .................... 425/384; 425/387.1; 425/392; 425/393; 425/503; 425/508
[58] Field of Search ............. 249/65; 264/36; 425/11, 425/13, 14, 384, 387.1, 392, 393, 503, 508, 509

[56] References Cited

U.S. PATENT DOCUMENTS

| | | | |
|---|---|---|---|
| 1,570,915 | 1/1926 | Nose | 249/65 |
| 2,823,418 | 2/1958 | Fritts | 425/509 |
| 3,359,599 | 12/1967 | Martin et al. | 425/392 |
| 3,662,045 | 5/1972 | Tierling | 264/36 |
| 4,350,548 | 9/1982 | Zenbayashi et al. | 264/36 |
| 4,410,391 | 10/1983 | Thomas et al. | 264/36 |
| 4,427,480 | 1/1984 | Kamuro et al. | 425/387.1 |
| 4,434,115 | 2/1984 | Chick | 264/36 |
| 4,456,401 | 6/1984 | Williams | 264/36 |
| 4,496,499 | 1/1985 | Brittain et al. | 264/36 |
| 4,810,453 | 3/1989 | Clarke et al. | 264/36 |
| 4,818,314 | 4/1989 | Brittain et al. | 264/36 |
| 4,863,365 | 9/1989 | LeDoux et al. | 425/392 |
| 4,867,921 | 9/1989 | Steketee, Jr. | 425/503 |
| 4,985,196 | 1/1991 | LeDoux et al. | 264/516 |
| 4,986,951 | 1/1991 | LeDoux et al. | 264/516 |

FOREIGN PATENT DOCUMENTS

| | | | |
|---|---|---|---|
| 3519439 | 12/1985 | Fed. Rep. of Germany. | |
| 60-228130 | 11/1985 | Japan | 425/11 |
| 61-290037 | 12/1986 | Japan | 264/36 |

Primary Examiner—Jay H. Woo
Assistant Examiner—C. Scott Bushey
Attorney, Agent, or Firm—Nixon & Vanderhye

[57] ABSTRACT

Apparatus for inserting a generally U-shaped liner into a pipe and reforming the U-shaped liner into a generally cylindrical cross-section to line the pipe includes winches for pulling the U-shaped liner through the pipe, pigs for cleaning the pipe, manifolds to connection at opposite ends of the pipe and wedge-shaped expansion members for initially mechanically reforming the ends of the liner projecting from the pipe. The wedge-shaped members include bores for communicating fluid at elevated temperature and pressure within the liner for setting the liner in generally cylindrical configuration against the pipe wall. A flaring tool is used to flare the opposite ends of the liner.

8 Claims, 4 Drawing Sheets

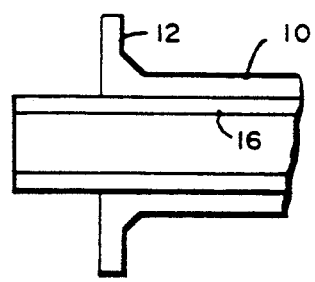
FIG. 11
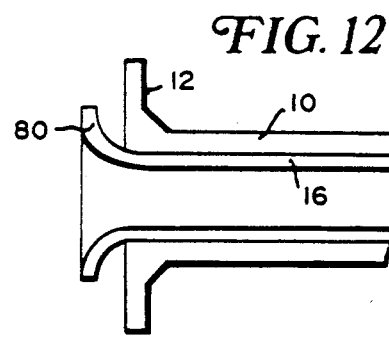
FIG. 12
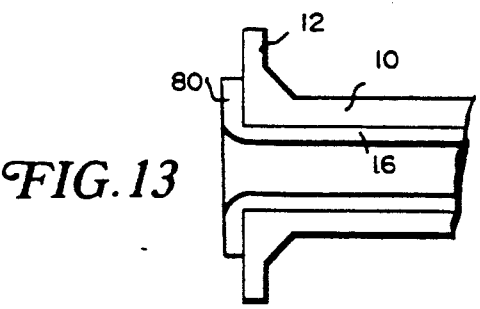
FIG. 13
FIG. 16
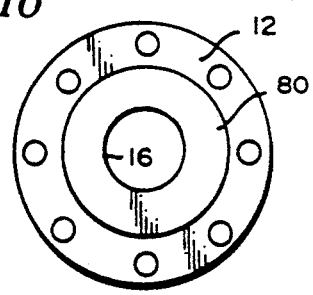
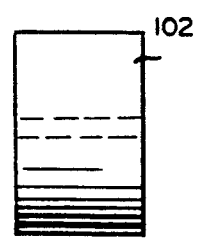
FIG. 15
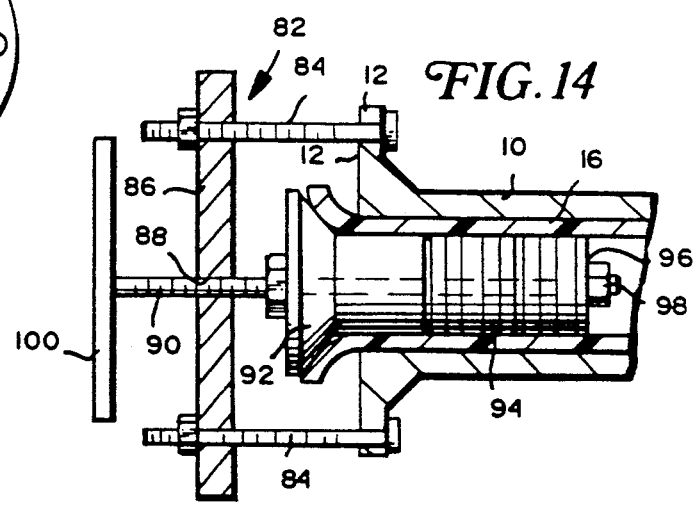
FIG. 14
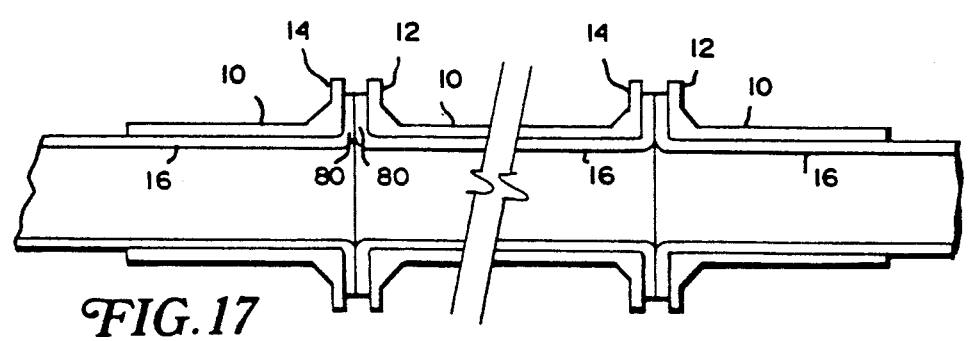
FIG. 17

PIPE LINING APPARATUS

This is a division of application Ser. No. 07/114,949, filed Oct. 30, 1987, now U.S. Pat. No. 4,985,196, issued Jan. 15, 1991.

BACKGROUND AND SUMMARY OF THE INVENTION

This invention relates to thermoplastic liners for pipes. Such liners may be applied during the initial manufacturing stage, or in later refurbishment and/or repair stages. In either case, the useful life of the pipe is significantly increased by the corrosion protection afforded by the use of such liners.

Pipe lining process are, of course, known in the art. U.S. Pat. Nos. 4,496,449; 4,394,202; 4,207,130; and 3,429,954; Canadian Patent No. 1,084,224; and U.K. Patent No. 2,084,686 are exemplary. These processes have not proven to be completely satisfactory, however. This invention relates to an improvement in a pipe lining concept disclosed in French patent No. 2,503,622 of Apr. 13, 1981. In that patent, a method of protecting pipe interiors with thermoplastic liners is disclosed, utilizing known shape memory characteristics of thermoplastic materials. Specifically, the patentee discloses the manufacture, by extrusion for example, of a cylindrical, thermoplastic pipe liner which has an elastic memory actuable above a certain temperature, and wherein the outside diameter of the liner is approximately equal to the inside diameter of the pipe to be lined. The pipe liner is then deformed at a temperature at least equal to the memory activation temperature so as to alter and reduce the cross-sectional dimension of the liner to facilitate insertion within the pipe to be lined. The temporarily deformed liner is preferably given a generally U-shaped cross-section, although other cross-sectional configurations such as H-shaped, or X-shaped are also contemplated. The liner is thereafter cooled to fix the liner in the temporarily deformed shape. After the deformed liner is inserted into the pipe, it is reheated to a temperature at least equal to the memory activation temperature to call the liner back to its original cylindrical shape.

In our own co-pending application Ser. No. 077,883, filed Jul. 27, 1987, now U.S. Pat. No. 4,863,365, issued Sep. 5, 1989 and incorporated herein by reference, we have disclosed a specific method and apparatus for manufacturing temporarily deformed thermoplastic conduit which is particularly useful in carrying out the concept disclosed in French Patent No. 8107346.

Generally, our earlier filed application discloses conventional extrusion of a thermoplastic material to a cylindrical shape at a temperature of 250°-300° F. The cylindrical liner is subsequently cooled to a temperature of about 160° F. and passed between a series of shaping rollers to reform the cylindrical liner into a substantially U-shaped configuration which reduces its cross-sectional dimensions by about 25%, after which the liner is cooled to ambient, and wound on a reel or spool.

The present invention relates to an improved method and apparatus for installing temporarily deformed pipe liner within a pipeline, expanding the deformed liner to its original cylindrical shape, taking additional steps causing the liner to conform even more precisely to the interior contour of the pipe, and flaring opposite ends of the liner into engagement with respective radially directed pipe flanges.

To this end, thermoplastic material is extruded and calibrated to obtain a cylindrical insert liner with a diameter slightly larger than the interior diameter of the pipe to be lined. Once extruded, the liner is temporarily collapsed in a manner described in our co-pending application Ser. No. 077,883, now U.S. Pat. No. 4,863,365, and wound in continuous form on a spool or reel for transport to the site.

Before inserting the U-shaped liner in a pipe or pipeline section, a number of preparatory steps must be taken. For example, after accessing the pipe to be lined by existing man or access holes, or by digging new access holes, the pipe connections must be broken and the interior of the pipe or pipeline section must be cleaned to remove all loose debris and/or sediment therein. Subsequently, a pulling or pilot line must be threaded through the pipeline to enable the U-shaped liner to be pulled into the pipe from the downstream end. In this regard, throughout this specification, "upstream" refers to that end of the pipe into which the liner is inserted, and "downstream" refers to the end remote from the insertion end. In addition, the term "pipe" is used hereinafter to refer to single, individual lengths of pipe, as well as to a plurality of individual lengths joined together to form a pipeline or section of pipeline. In other words, "pipe" refers to any one or more lengths of pipe to be lined in accordance with this invention. Moreover, regardless of the number of individual lengths of pipe to be lined, typically, the open ends of the pipe or pipes, which define the overall length to be lined, are provided with conventional radial flanges to facilitate attachment to adjacent pipe sections. Such flanges are also utilized in conjunction with the installation process and apparatus of this invention as explained in greater detail below.

The cleaning and threading operations may be effected by a single brush pig of conventional design. At the same time, the brush pig is utilized to pass the pilot or pulling line through the pipe. To facilitate not only the pigging operation, but the liner insertion and expansion operations as well, a tubular manifold, which opens into the pipe at one end and which is closed by a removable flange at the other end, is applied to each end of the pipe, via the above-described radial flanges and fasteners such as bolts or the like. Prior to attaching the manifold at the upstream end, the brush pig is introduced into the manifold, and a pulling or pilot line is fed into a vent in the manifold and attached to the trailing end of the pig.

Once the manifolds are attached at either end of the pipe, liquid or air is supplied behind the pig to drive it the length of the pipe. At the same time, a relief valve in the downstream manifold permits air ahead of the pig to be released from the pipe interior. Brushes attached to the front of the pig clean the interior pipe wall surface in a manner well understood by those skilled in the art.

When the pig and pulling lines have reached the downstream end of the pipe, the downstream manifold is opened and the pig removed. The pulling line is then attached to a downstream winch or other suitable winding device.

At the upstream end, the upstream manifold is opened and the pilot or pulling line cut from the supply reel. The line is then drawn through the open manifold and attached to a lead end of the U-shaped liner. The U-shaped liner may then be pulled from its own supply reel into the pipe via actuation of the downstream winch or other suitable winding device.

It will be appreciated that depending on the length of pipe, the pressure available to push the pig through the pipe, and the tensile strength of the pulling line, a multiple stage process may be required to thread the final pulling line through the pipe. For example, for long sections of pipe on the order of 2 miles or even longer, or where there is a leak in the pipe, the pressure buildup in the pipe may not be sufficient to push the pig and, at the same time, pull a line or cable of the required strength through the pipe. In this case, a relatively light, so-called "fishing line" is initially threaded through the pipe by a relatively lightweight pig, followed by one or more increasingly stronger lines, drawn by larger pigs, until the final pulling line or cable is drawn through the pipe.

Once the liner is drawn into the pipe via the downstream winch, it is cut to an appropriate length, such that a relatively short section of liner extends beyond either end of the pipe, i.e., to approximately the length of the pipe section itself plus upstream and downstream manifolds at either end. Subsequently, packer/expander assemblies are introduced into the manifolds to seal the liner ends and to mechanically initiate expansion of the liner. Thereafter, fluid, preferably hot liquid from a closed boiler system, is supplied through one of the packer/expander assemblies and into the pipe to reheat the liner to a temperature of about 160° F. During the reheating stage, an outlet valve in the manifold opposite that through which the hot liquid is supplied, is left partially open to allow the hot liquid to flow through, until the desired temperature is achieved. Once the liner has reached 160° F., it will begin to assume its original cylindrical shape. At the same time, pressure within the liner rises, preferably to about 7 bars in a first pressurizing stage.

It is often the case, however, that the pipe itself may not be perfectly round along its entire length and, therefore, absent some further step, there may be annular or other pockets of air between the liner and the inner pipe wall.

According to this invention, the outlet valve is adjusted so that the pressure within the liner is increased in a second stage to about 15 bars to cause the liner to conform more precisely to the inner surface contours of the pipe.

Subsequently, the packer/expander assemblies are removed and the hot liquid, such as water, is emptied from the pipe. An expansion pig is then introduced into the upstream manifold to traverse the pipeline while the latter is still hot, and to apply a radially outwardly directed force about the circumference of the liner to squeeze out any remaining air between the liner and pipe used thereby ensure even further conformance to the inner pipe wall, including weldments and other surface irregularities. This second pig is driven through the pipeline with cold water which tends to "freeze" the liner in place.

Once liner expansion within the pipe is completed, the upstream and downstream manifolds are removed, and the liner ends are reheated and flared into contact with the blind flanges of the pipe, as described in further detail below.

By this invention, pipes of between 2 and 24 inches in diameter, and as long as two miles or more may be fitted with a continuous liner to provide ideal corrosion protection in both new and existing corroded pipes.

Other advantages of this invention include:

1. Structural characteristics of the pipe to be relined are preserved while the thickness of the U-Liner wall can be from 3.5 to 18 mm, depending on design requirements. The minimal reduced inside diameter will be compensated by the exceptional flow coefficient of the thermoplastic liner.

2. In the case of new pipe projects, U-Liner can be used to avoid the need for expensive materials such as stainless steel or alloys for transport of highly corrosive products. In most cases, the flow inside the plastic liner will be more efficient than if stainless steel or alloy pipes are used.

3. Lining of internally corrodible pipes will provide operators with longer life in both new and repaired pipelines, without costly total replacement of pipe sections due to corrosion damage. This will effectively reduce repair and maintenance downtime and therefore greatly reduce production loss.

4. Since the U-Liner can be inserted in very long sections, this method simplifies the often difficult and much protested surface disturbance of right-of-way in environmentally sensitive areas or across urban concentrations of people and traffic.

5. Although the normal use life expectancy of the thermoplastic lining is up to twenty years, unexpected damage can be repaired economically due to the easy removal and replacement of the U-Liner and its relatively minimal cost. The thermoplastic insert U-Liner will restore corroded pipes to original flow quality and eliminate further abrasion and corrosion damage to the steel pipe walls, thus substantially lengthening the economic life of the installation.

6. The process is simple, fast and cost effective, with minimum downtime.

In a preferred embodiment, the pipe liner is constructed of high density polyethylene (HDPE), but other thermoplastic materials may also be employed.

The preferred HDPE liner material has been tested with over 280 chemicals that might be expected to flow through a pipeline and the following observations have been reported relating to the above identified HDPE which are particularly relevant to this invention:

(a) high resistance to $H_2S$, $CO_2$ and NaCl;
(b) excellent for transporting gases;
(c) cross-linkable to handle products at high temperatures (250° F.);
(d) stability in aging;
(e) low roughness coefficient of 0.020;
(f) does not retain deposits or sediments.

The invention as described herein has applications to many types of pipeline, including water and mud injection; oil and gas; vapors and fumes; saltwater; utility sewage and drainage; gas gathering and distribution, etc.

Other objects and advantages will become apparent from the detailed description of the invention which follows.

BRIEF DESCRIPTION OF THE DRAWINGS

FIGS. 11-13 represent a schematic progression illustrating the formation of a radial flange on a pipe liner in accordance with the invention;

FIG. 14 is a top sectional view illustrating a flaring tool in accordance with the subject invention;

FIG. 15 is a side view of a tool element for use with the flaring tool illustrated in FIG. 14;

FIG. 16 is an end view of a pipe lined in accordance with the invention; and

FIG. 17 is a side schematic view illustrating a plurality of aligned pipe sections with individual pipe liners in accordance with the invention.

DETAILED DESCRIPTION OF THE DRAWINGS

Figure 1:
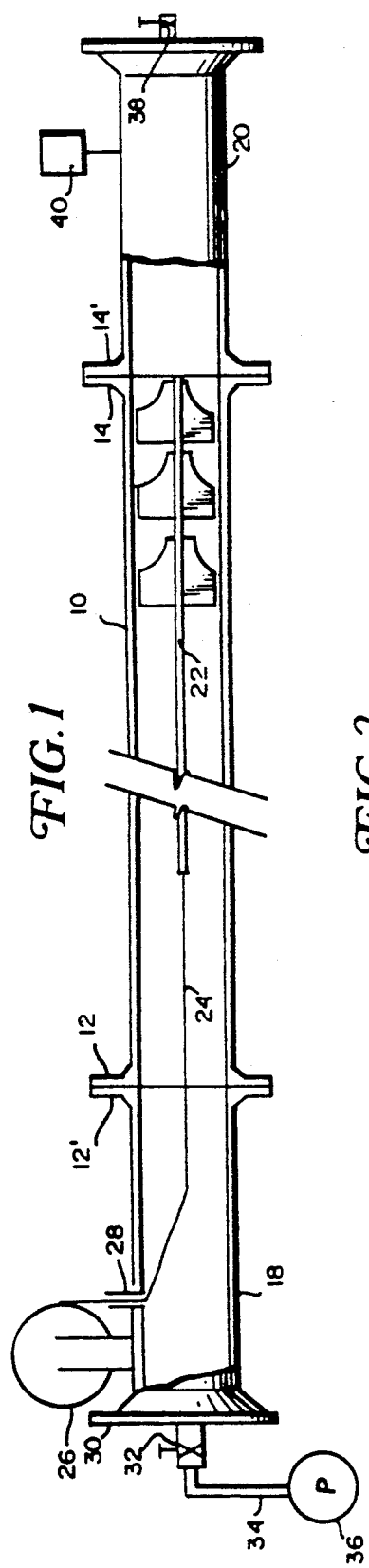
FIG. 1 is a schematic side view showing a pilot line being pulled through a pipe section to be lined in accordance with the invention.

With reference now to FIG. 1, a cylindrical section 10 of pipe to be lined in accordance with this invention is shown in schematic form. The pipe is formed with radial flanges 12, 14 at either end to enable connection with adjacent pipe sections in a conventional manner. It is the objective of this invention to provide a cylindrical liner 16 for the pipe section 10 which may be newly manufactured, or an older pipe in need of rehabilitation. The liner 16 in its final installed form is shown in FIGS. 4, 10, 16 and 17.

In a preferred embodiment, the liner is constructed of HDPE which may be a Union Carbide DGDB-2480 Black 4865 compound meeting the requirements of ASTM 1248-81a for Type PE 34 Class C product. It is characterized by a high level of environmental stress cracking resistance and high strength. Nylon, Teflon TM, ABS or any other such plastic material may also be utilized.

While the pipe lining procedure is shown primarily in schematic form, it will be understood that the pipe may be lined above ground or, in situ, underground or underwater. In any or all of the above cases, it may be necessary to disconnect the pipeline at selected, longitudinally spaced access points and, if continuous pipeline flow is required, splice in a bypass section between pipe sections on either side of the section to be lined. This bypassing or splicing procedure forms no part of the present invention and need not be described further.

Before commencing the lining operation, the pipe section should be inspected to determine its ability to withstand pressures applied during the lining operation. Of course, if the pipe is damaged, corroded, etc. to the point of not being able to withstand such pressures, then the pipe section in question must to be replaced rather than lined.

The interior of the pipe 10 may be cleaned by a conventional brush pig 22 designed to traverse the pipe interior with brushes extending radially into contact with the interior pipe wall, to effect removal of loose material, residue, sediment, and the like which might otherwise negatively impact the lining process. Once the pig 22 is introduced into the upstream end of the pipe 10, upstream and downstream manifolds 18 and 20 are attached to the pipe flanges 12, 14, respectively. To facilitate this connection, the manifolds are provided with abutting flanges 12', 14' and connection is achieved via bolts or other suitable fasteners in conjunction with aligned apertures (FIG. 16) in the respective flanges.

A pulling or pilot line 24, fed from a reel 26 through a vent hole 28 in the manifold 18, is attached to the trailing end of the pig 22 before closure of the upstream manifold 18.

The upstream manifold 18 has a closed end 30 which comprises a removable plate, and in which is mounted an inlet valve 32. In this initial pigging operation, the valve 32 is connected via conduit 34 to a pressurized air or liquid source 36. The downstream manifold 20 is also provided with an end plate which mounts a relief valve 38. A pressure gauge 40 monitors pressure within the pipe.

Pressurized air or water is introduced through a valve 32 into the pipe behind the pig 22, so as to push the brush pig and pulling line 24 through the pipe to the downstream end thereof. During this pigging operation, relief valve 38 is set at about 100 psi to ensure proper degassing of the pipe as the pig moves to the downstream end of the pipe. When the pig 22 reaches the downstream end, and moves into the manifold 20, the interior pressure of the pipe is gradually released, manifolds 18 and 20 are opened, and pig 22 removed. Thereafter, line 24 may be drawn out and subsequently fastened to an associated winch or reel 44 as shown in FIG. 2.

Figure 2:
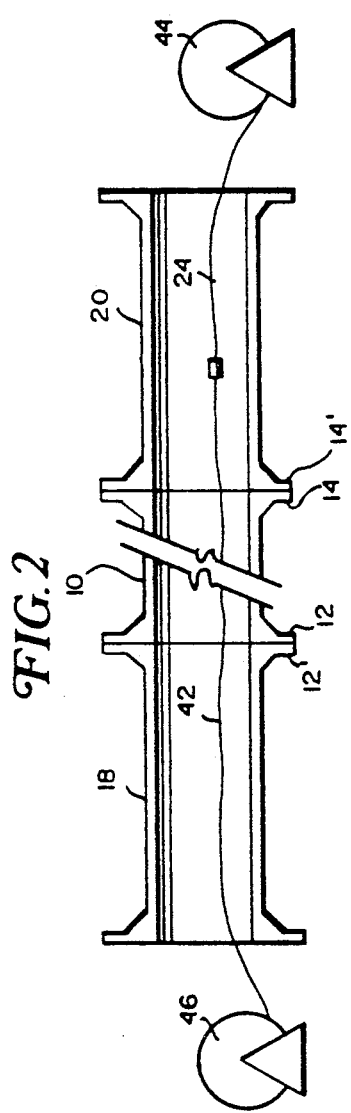
FIG. 2 is a schematic, side view illustrating a further step in a pipe lining process wherein a heavier gauge pulling line is being pulled through the pipe section to be lined.
Figure 3:
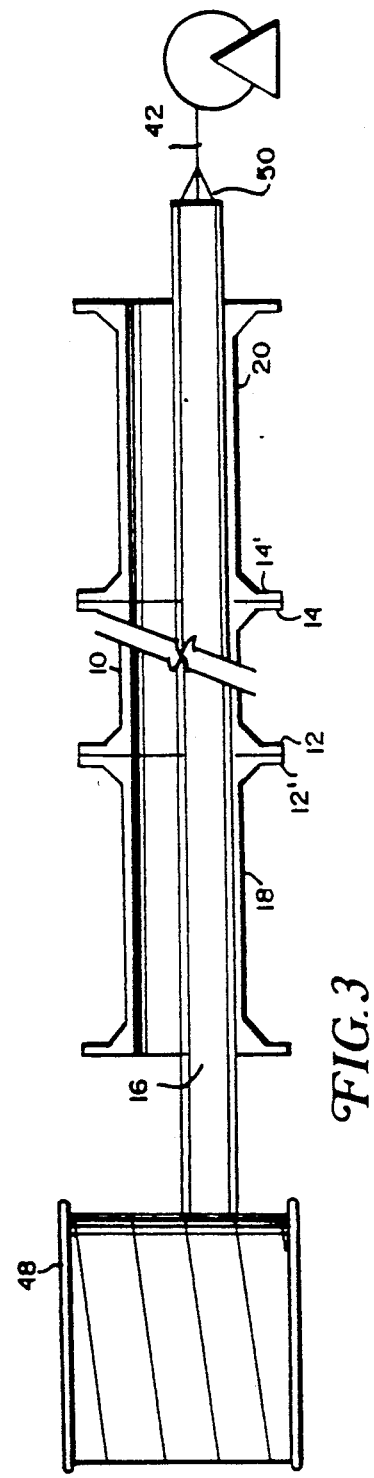
FIG. 3 is a schematic top view illustrating a temporarily deformed pipe liner being pulled through a pipe section in accordance with the invention.

With further reference to FIG. 2, the pipe section 10 is shown with manifolds 18 and 20 opened at their remote ends and with an initial lightweight fishing line 24 connected to a heavier gauge pulling or pilot line 42. Lines 24 and 42 are pulled through the pipeline 10 by a winch 44 located adjacent the downstream end of the pipeline 10 and manifold 20. The pilot line 42 is unwound from a reel 46 at the upstream end of the pipeline section. As indicated earlier, the requirement for progressively stronger pilot or pulling lines is necessitated only if the pipeline section to be lined is of great length or, if there is an inability to build up sufficient pressure, by reason of leakage for example, in the existing pipeline, to push the pig 22 and associated fishing or pilot line through the pipe section. Once the appropriate gauge pulling line is drawn through the pipe section 10, it may be cut adjacent the upstream manifold 18 and thereafter attached to the temporarily deformed U-shaped liner 16, as more clearly illustrated in FIG. 3. The pulling line 42 is connected to the U-shaped liner 16 by a suitable gripping arrangement shown in schematic form at 50 in FIG. 3. Preferably, the gripping means 50 is of the radial expansion type so as to prevent damage to the end of the liner. As also illustrated in FIG. 3, the U-shaped liner 16 may be unwound from a storage or supply reel 48 which is located adjacent the upstream manifold 18. It will be appreciated that depending on the diameter of the originally extruded liner 16, the liner may be temporarily deformed at the factory and shipped in continuously wound reels 48 or, where the diameter of the originally extruded pipe is so large as to make such predeformation and shipment impractical, portable deforming apparatus may be provided at the site for deforming the liner 16 in situ and drawing it through the pipe section to be lined in one continuous operation.

Figure 6:
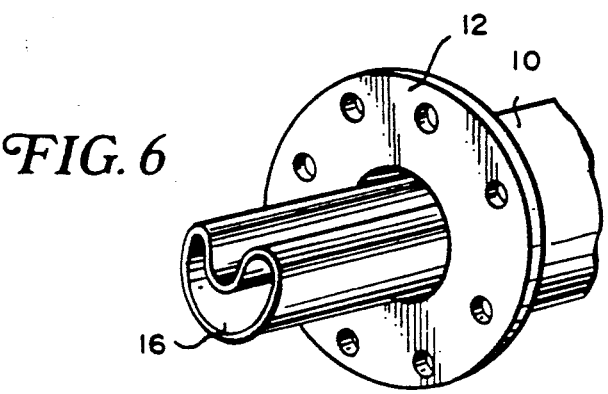
FIG. 6 is a partial, perspective view illustrating a temporarily deformed liner within a pipe section to be lined.
Figure 5:
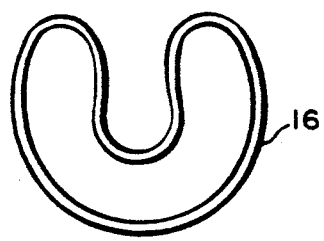
FIG. 5 is a cross-sectional view of a temporarily deformed pipe liner in accordance with the invention.
Figure 4:
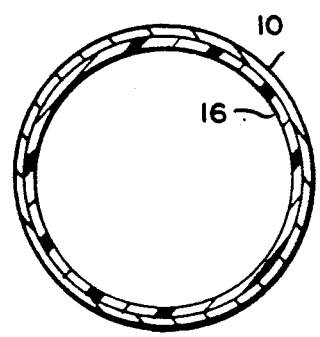
FIG. 4 is a cross-sectional view of a pipe section and associated liner.
Figure 7:
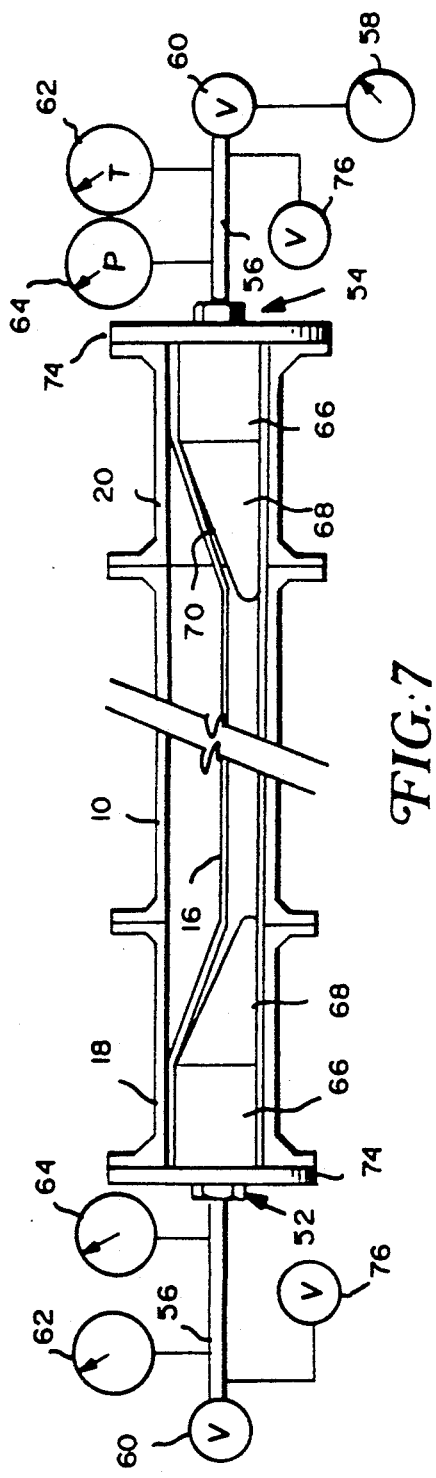
FIG. 7 is a schematic side view illustrating the commencement of a pipe liner expansion process in accordance with the invention.

FIG. 4 illustrates a cross-sectional view of pipeline section 10 with the liner 16 in its finally expanded form. This is to contrasted with the cross-sectional view of the pipe liner 16 in FIG. 5 which illustrates it in its temporarily deformed U-shape. In FIG. 6, a perspective view illustrates the temporarily deformed U-shaped liner 16 after it is pulled through the pipe section 10 to be lined. Turning now to FIG. 7, it will be noted initially that the liner 16 extends approximately to the open ends of the manifolds 18 and 20 to not only facilitate the expansion process, but also to leave sufficient liner to form radial flanges in a manner to be described in greater detail below.

Figure 8:
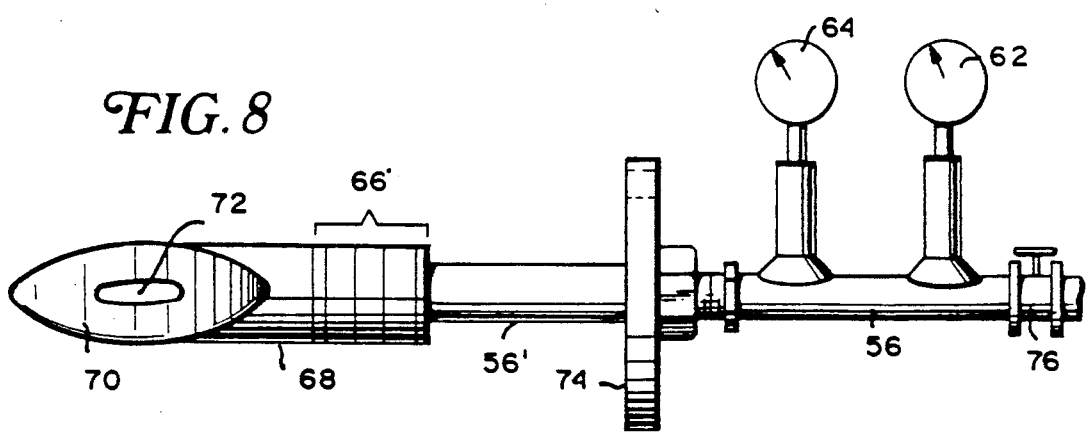
FIG. 8 is a side elevation of a packer/expander assembly for use in the subject invention.
Figure 9:
FIG.9 is a partial side view of the device illustrated in FIG. 8.

In FIG. 7, there is schematically shown a representation of the initial expansion of the liner 16 within the pipe 10. Once the liner is properly positioned, a pair of mechanical expansion/packer assemblies are inserted into the liner from either end of the upstream and downstream manifolds 18, 20. The packer/expander assemblies 52, 54 are identical in every respect and, therefore, only one need be described in detail. As best seen in FIGS. 7-9, the downstream packer/expander 54 assembly includes an inlet conduit or manifold 56 operatively connected to a closed boiler 58 through which hot liquid may be introduced into the liner via valve 60. The temperature of the liquid is monitored by a conventional gauge 62, while the pressure within the liner is monitored by a conventional pressure gauge 64. Inlet pipe 56 is connected via pipe extension 56' to a cylindrical packer assembly 66 consisting of conventional packing rings which are sized to seal off the liner relative to the manifold 20 to prevent any escape of liquid from the liner through the manifold. A cylindrical wedge-like expander 68, provided with a tapered surface 70, extends forward of the packer assembly and serves to force the liner end back into a cylindrical shape, as best seen in FIG. 7. A similar arrangement is provided at the upstream manifold 18 so that the liner 16 is initially expanded mechanically at both ends in the above described manner. The expander 68 is provided with an internal bore 72 (FIGS. 8 and 9) which operatively connects to the inlet conduit 56 and closed boiler 58. It will thus be appreciated that expander 68 only initiates the expansion process, while facilitating introduction of hot liquid through the bore 72 and into the liner 16.

Once the packer/expander assemblies 52, 54 have been positioned within the manifolds 18, 20, respectively, so that flanges 74 abut corresponding flanges on the manifolds 18, 20, hot water is introduced from the source 58 into the interior of the liner. Because the system is closed, the hot water may be raised to high temperatures without the creation of steam and, in this initial stage, the hot water is introduced into the liner so as to raise the temperature of the liner to approximately 160° F. In the temperature raising stage, a relief valve 76 in the packer/expander assembly 52, allows hot water to flow continuously through the liner, at a first pressure of about 7 bars. It will be appreciated that the period of time required to reheat the liner to its shape memory temperature at the first pressure will depend on the diameter and length of the pipe to be lined.

Figure 10:
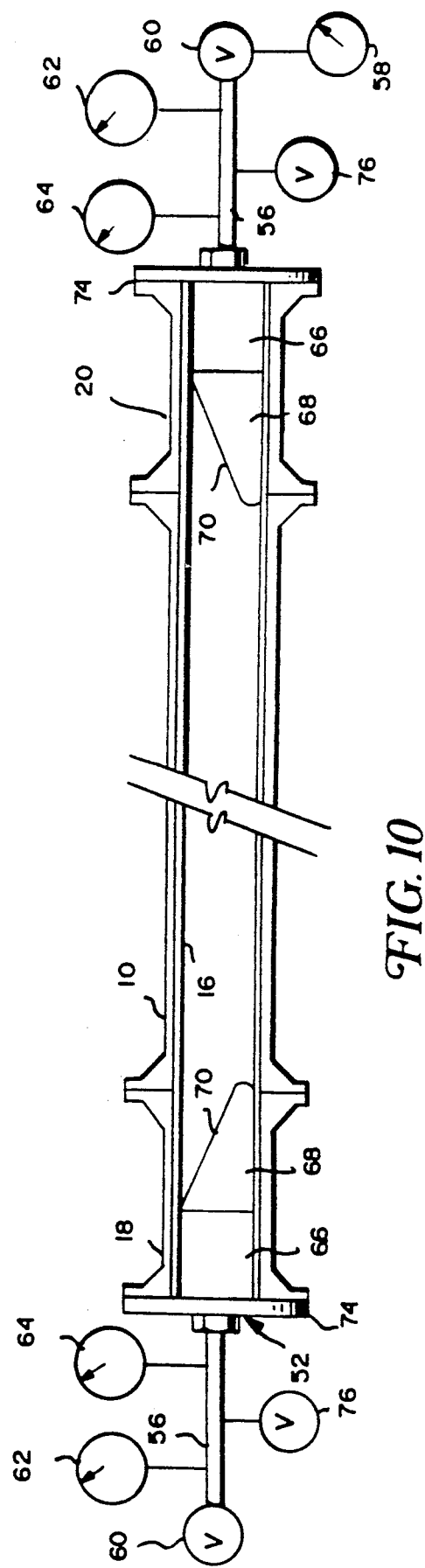
FIG. 10 is a side schematic view illustrating a fully expanded pipe liner in accordance with the invention.

Once the liner has been heated to 160°, the U-shaped memory of the liner is erased and the liner tends to assume its original cylindrical shape. However, as previously mentioned, because the interior wall of the pipe 10 may not be perfectly round, the now cylindrical liner 16 may not conform exactly to the inner surface of the pipe which may be warped, particularly over extended distances. Accordingly, the pressure inside the liner is raised in a second stage to about 15 bars to expand the liner 16 into substantially exact conformance with the interior surface of the pipe 10, as illustrated in FIG. 10.

Thereafter, valve 60 is closed, hot water supply 58 disconnected, and the hot water within the pipe is emptied. The packer/expander assemblies 52, 54 are then withdrawn. It is a further feature of this invention that, while the liner is still hot, a conventional expansion pig, having a diameter substantially identical to the inside diameter of the expanded liner, is introduced into the pipe 10 and is pushed through the pipe section applying a radial force to the liner so as squeeze any remaining air from between the pipe and liner so as to conform 100% of the liner surface against the interior surface of the pipe. The pig is preferably driven by a supply of cold water which more or less "freezes" the plastic into final form behind the pig, eliminating all air spaces between the liner and the pipe section.

While the expansion stage has been described with reference to the introduction of heated fluid from source 58 at the downstream side of the pipe 10 via packer/expander assembly 54, it will be appreciated that source 58 may be operatively connected to the upstream assembly 52 as well. In this regard, manifolds 18, 20 and assemblies 52, 54, including conduit 56 are provided with the necessary inlets, outlets for monitoring devices, relief valves, and the like so that, in effect, they are interchangeable.

Turning now to FIGS. 11 through 13, a schematic progression of steps involved in the liner end flaring process is illustrated. Thus, FIG. 11 shows the expanded liner 16 extending beyond pipe 10, with the manifold 18 removed. Typically, the liner will be trimmed in accordance with predetermined and calculated data establishing the length of liner required to produce a given size radial flange for pipes of various diameters. Once the liner is trimmed, a first flaring stage commences wherein the liner end is heated, by an air gun for example, to about 180°-200° F., and flange 80 is partially formed at an angle of about 50° to about 70°, relative to horizontal, as shown in FIG. 12. The specific angle will depend on factors such as the diameter of the pipe, the flange length, and so on. Once the initial flare is formed in the liner end, the latter is quickly cooled and then reheated to about 180°-200° F. In a second flaring stage, the partially flared end is further deformed into engagement with pipe flange 12 to form radial flanges 80 as illustrated in FIG. 13, after which the liner is again quickly cooled.

FIG. 14 illustrates an exemplary flaring tool for carrying out the first and second flaring stages as described above. A manually operated screw jack 82 is fastened at at least two locations, preferably 180° apart, about the pipe flange 12. Thus, a pair of heavy duty bolts 84 extend between bolt holes formed in the flange 12 and a cross bar 86. Bar 86 is provided with a threaded aperture 88, intermediate the ends thereof, for receiving a threaded jack member 90 which mounts a flaring tool 92, a packing assembly 94, a washer 96 and a nut 98 on one side of the cross-bar 86, and a handle 100 on the other side of the cross bar. Rotation of handle 100 in a clockwise direction will result in flaring tool 92 entering the liner end to flare the same in a first flaring stage as previously described. The packer assembly 94 is utilized to prevent the liner 16 from creeping into the pipe 10 during the flaring operation. After completion of the first flaring stage, tool 92 is removed from jack 90 and is replaced by a second stage flaring tool 102, shown in FIG. 15. This second stage tool is no more than a bored, cylindrical block which flattens the partial flare into full engagement with the pipe flange 12. In this regard, FIG. 16 shows in an end view, the liner 16 in its finally flared and expanded configuration within the pipe 10.

In further connection with the first and second flaring stages, it will be appreciated that the speed with which the flaring tools are brought into engagement with the liner end or ends must be correlated to the pipe diameter, temperature, etc. to prevent damage to the end or ends. Thus, the flaring tools do not engage the liner end or ends, until the temperature, monitored by conventional means, reaches the predetermined level. In addition, during the flaring stages, the tools remain in full pressure engagement with the liner end or ends during the respective cooling steps.

It will be further appreciated that the screw jack 82 may be hydraulically actuated, particularly for larger diameter pipes.

In FIG. 17, there is illustrated a plurality of adjacent pipes 10, each having an individual liner 16 applied in accordance with the above described process. The formation of radial flanges 80 on each liner section results in a continuous interior lining with no pipe exposure to the materials flowing through the pipeline. This of course is an alternative to introducing a single continuous liner through a plurality of single pipe sections, but with similarly effective results.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. Apparatus for installing a collapsed generally U-shaped liner within a pipe wherein the liner has a radially inwardly extending fold extending longitudinally along its length, comprising:

means for pulling said liner into and through said pipe such that said liner extends outwardly from opposite ends of said pipe;

means for mechanically initiating expansion of said liner at opposite ends thereof and including a pair of generally cylindrical members, each of said members having a wedge shape at one end defining a generally inclined face between opposite sides thereof, with one side extending axially beyond the opposite side to define a tip along said opposite side for engaging within an outwardly extending end of the generally U-shaped pipe liner between one side of the liner and the inwardly extending fold thereof to reform the liner end into a generally cylindrical configuration;

each said wedge-shaped member having packing means for sealing the cylindrical end of the liner after the initial expansion thereof into the cylindrical configuration, one of said members having an internal bore for connection to a fluid source for introducing fluid into the liner; and means for applying heat within said liner including flowing heated fluid through said bore to raise the temperature of the liner.

2. Apparatus as defined in claim 1 and further including means for cleaning the interior of the pipe while simultaneously carrying a pilot line through said pipe.

3. Apparatus as defined in claim 2 wherein said cleaning and carrying means comprises a brush pig.

4. Apparatus as defined in claim 3 and further including fluid means for driving said pig through said pipe.

5. Apparatus as defined in claim 1 and further including manifold means for connection to said pipe at either end thereof, and wherein said wedge shaped members and packing means are received within said manifold means.

6. Apparatus as defined in claim 1 and further including flaring means for forming radial flanges in said liner at either end of said pipe.

7. Apparatus as defined in claim 6 wherein said flaring means includes a first flaring tool operable to partially flare said liner ends, and a second flaring tool operable to provide substantially 90° radial flanges on said liner ends, wherein said flanges are in engagement with radial flanges provided on said pipe.

8. Apparatus according to claim 7 wherein said wedge-shaped members extend cylindrically from said inclined face thereof in an axial direction away from said tip.

* * * * *